United States Patent
Sesek et al.

(10) Patent No.: US 7,054,021 B2
(45) Date of Patent: May 30, 2006

(54) SYSTEM AND METHOD FOR PRINTING MULTIPLE PRINT JOBS IN A SINGLE ACTION

(75) Inventors: Robert Sesek, Boise, ID (US); Gary G. Stringham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 964 days.

(21) Appl. No.: 09/905,582

(22) Filed: Jul. 13, 2001

(65) Prior Publication Data

US 2003/0011812 A1    Jan. 16, 2003

(51) Int. Cl.
*B41J 1/00*    (2006.01)

(52) U.S. Cl. .................. 358/1.15; 358/1.14; 358/1.16; 358/1.18; 400/70; 709/224

(58) Field of Classification Search ............... 358/1.15; 400/70; 713/200; 709/224
See application file for complete search history.

(56) References Cited

U.S. PATENT DOCUMENTS

| | | | | |
|---|---|---|---|---|
| 6,431,772 B1 * | 8/2002 | Melo et al. | ................... | 400/70 |
| 6,469,796 B1 * | 10/2002 | Leiman et al. | ............. | 358/1.15 |
| 6,687,018 B1 * | 2/2004 | Leong et al. | ............. | 358/1.15 |
| 6,809,831 B1 * | 10/2004 | Minari | ....................... | 358/1.15 |
| 6,819,444 B1 * | 11/2004 | Yamagishi | ................. | 358/1.15 |
| 6,859,832 B1 * | 2/2005 | Gecht et al. | ................ | 709/224 |
| 2001/0022668 A1 * | 9/2001 | Gassho et al. | ............. | 358/1.15 |
| 2002/0016921 A1 * | 2/2002 | Olsen et al. | ................ | 713/200 |

* cited by examiner

*Primary Examiner*—Kimberly Williams
*Assistant Examiner*—Satwant Singh

(57) ABSTRACT

A system and method for printing multiple print jobs with a single command. The system typically includes a processor linked via a communications link to a plurality of printers. The processor includes a user interface that is configured to accommodate user selection of plural print jobs. The processor is further configured to communicate the plural print jobs to plural printers upon a single command. Moreover, the plural print jobs may be stored in the form of a print distribution list for subsequent use.

17 Claims, 4 Drawing Sheets

Fig. 2

| PRINT | | | | | | | | |
|---|---|---|---|---|---|---|---|---|
| DISTRIBUTION LIST : MARKETING ▶ | | | | | | | | |
| PRINTER (LOCATION) | OUT-PUT BIN | MEDIA SIZE | PAGES PER SHEET | NUMBER OF COPIES | FINISH | MEDIA TYPE | DUPLEX? | PRINT RES. | COLOR? |
| LJ-4500 (OFFICE A MGR) | 1 | LETTER | 4 | 1 | N/A | NORMAL | YES | 800DPI | YES |
| LJ-4500 (OFFICE A MGR) | 2 | LETTER | 1 | 2 | N/A | TRANSPARENCY | NO | 600DPI | NO |
| LJ-8100 (OFFICE A GROUP 1) | 1 | A4 | 1 | 3 | STAPLED | LETTERHEAD | NO | 1200DPI | YES |
| LJ-8100 (SINGAPORE OFFICE) | 1 | LETTER | 1 | 5 | | CARD STOCK | NO | 1200DPI | YES |
| | | | | | | | | | |
| | | | | | | | | | |
| | | | | | | | | | SUBMIT |

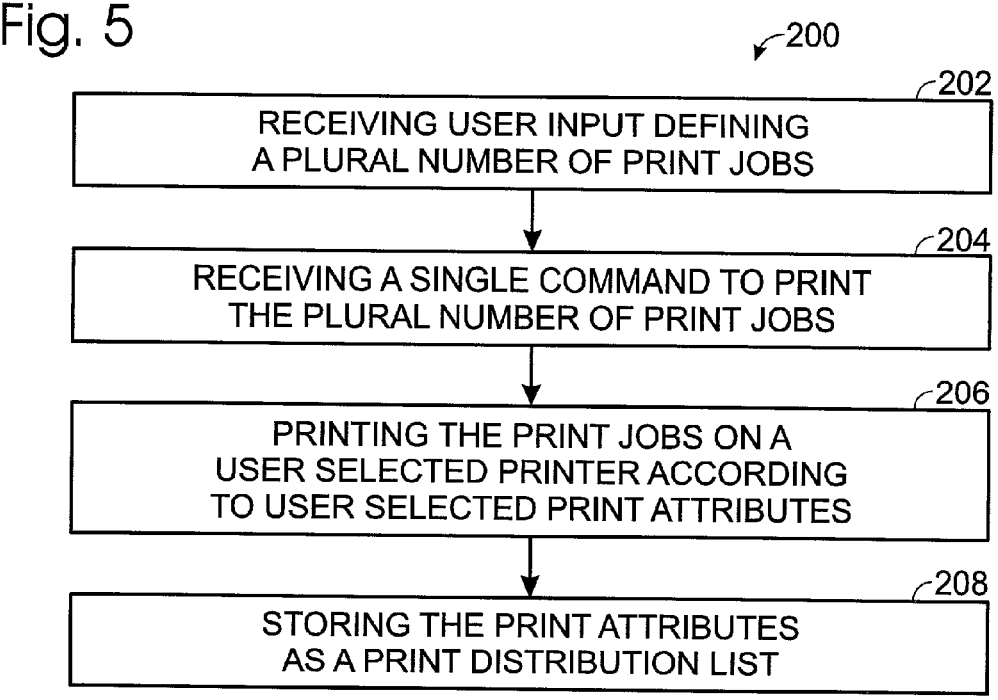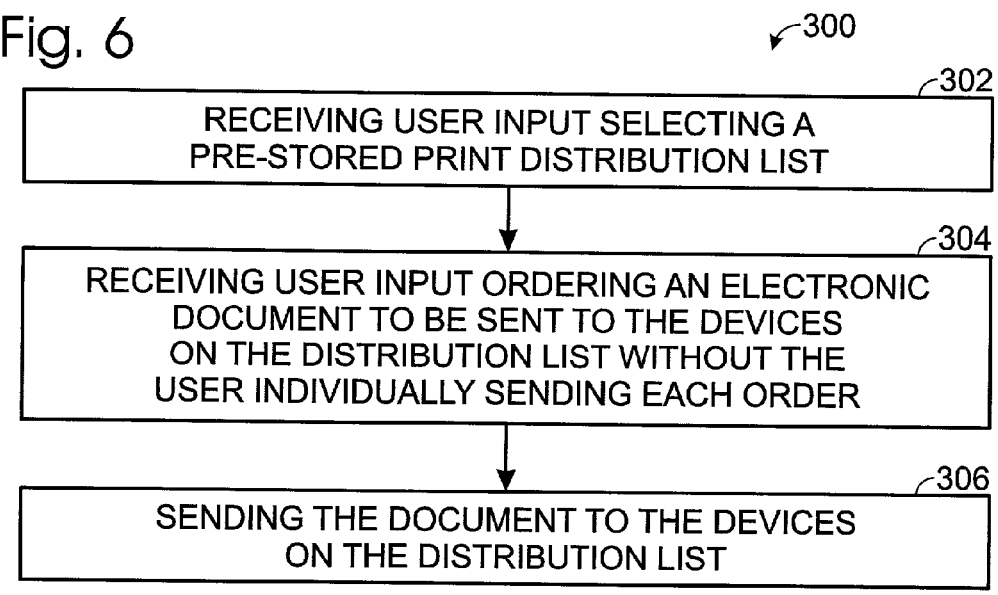

SYSTEM AND METHOD FOR PRINTING MULTIPLE PRINT JOBS IN A SINGLE ACTION

FIELD OF THE INVENTION

The present invention relates generally to printers, and more particularly, to a system and method for printing multiple print jobs with a single print request.

BACKGROUND OF THE INVENTION

With the advent of computer networks and networked printers, users are now able to select different printers on a network for different print jobs. Users choose different printers on a network depending on a number of factors. For example, if a user wants to print numerous copies of a document, a user may choose a high speed printer, which may rasterize the document one time, but prints multiple copies so as to maintain print speed for the entire print job. Moreover, a user may choose a printer that is in close proximity to the user, or which is in close proximity to an intended recipient of the document. Similarly, a user may choose a printer based on other features of the printer, including printer model, media selection options, graphics capability, color, etc.

However with existing networked printer systems, each time a user wants to select a different printer or print a print job with different attributes, the user must submit a new print request identifying a print destination and a corresponding print format. Moreover, a user printing to the same printer must submit a new print request for each print job with different attributes. Such systems are time consuming, especially where a user wants to print the same document on multiple printers, because the user must submit a new print job for each printer selected. For example, a user who wants to print a document on two remote printers and two local printers must submit four print requests (one for each printer), each indicating the specific print attributes desired. Additionally, a user who wants to print a document on A-4 media and on letter media on the same printer must submit two print requests (one for each attribute set).

The additional steps required to submit multiple print jobs for the same document seems especially burdensome when a user regularly sends print jobs to an identical grouping of printers. For example, if a user each week prints an updated report at printers in six departments, then every week the user must make six individual print requests to the six printers. The user each week must resubmit the same set of print requests.

What is needed is a system and method that permits a user to send multiple print jobs with a single print request. Furthermore, it would be useful if the user could customize each of the multiple print jobs. Moreover, it would be desirable if a user could access a preselected set of print jobs.

SUMMARY OF THE INVENTION

Briefly, the invention includes a computer-based system and method for printing multiple print jobs with a single command. The computer-based system thus may include a computer having a processor and a set of printers linked to the computer via a communications link. The processor may be configured to provide a user interface, which accommodates user selection of plural print jobs. The user interface may also be configured to accommodate different attributes for each print job. The processor is further configured to communicate plural print jobs to respective printers corresponding to the attributes of the print job without the user having to separately send each individual print job. Thus, in a single print request, a user may send multiple customized print jobs to user-selected print destinations. Additionally, a user may be able to store the user-selected print attributes for the plural print jobs for later use.

The computer-based method may be employed in a computer linked to a set of associated printers. In accordance with the invention, the method includes receiving user input defining a plural number of print jobs. The method further includes receiving a single command to print the plural number of print jobs. Thereafter, the print job may be automatically sent to each user-selected printer according to the user-selected attributes. Moreover, according to another aspect of the invention, the method may include creating and storing pre-selected sets of print jobs.

DESCRIPTION OF THE FIGURES

FIG. 2 is a representative user interface for the system depicted in FIG. 1, displaying user-selected printers and additional user-selectable attributes.

FIG. 5 is a flowchart demonstrating a printing method according to the present invention.

FIG. 6 is a flowchart demonstrating an alternative printing method according to the present invention.

DETAILED DESCRIPTION OF THE INVENTION

Figure 1:
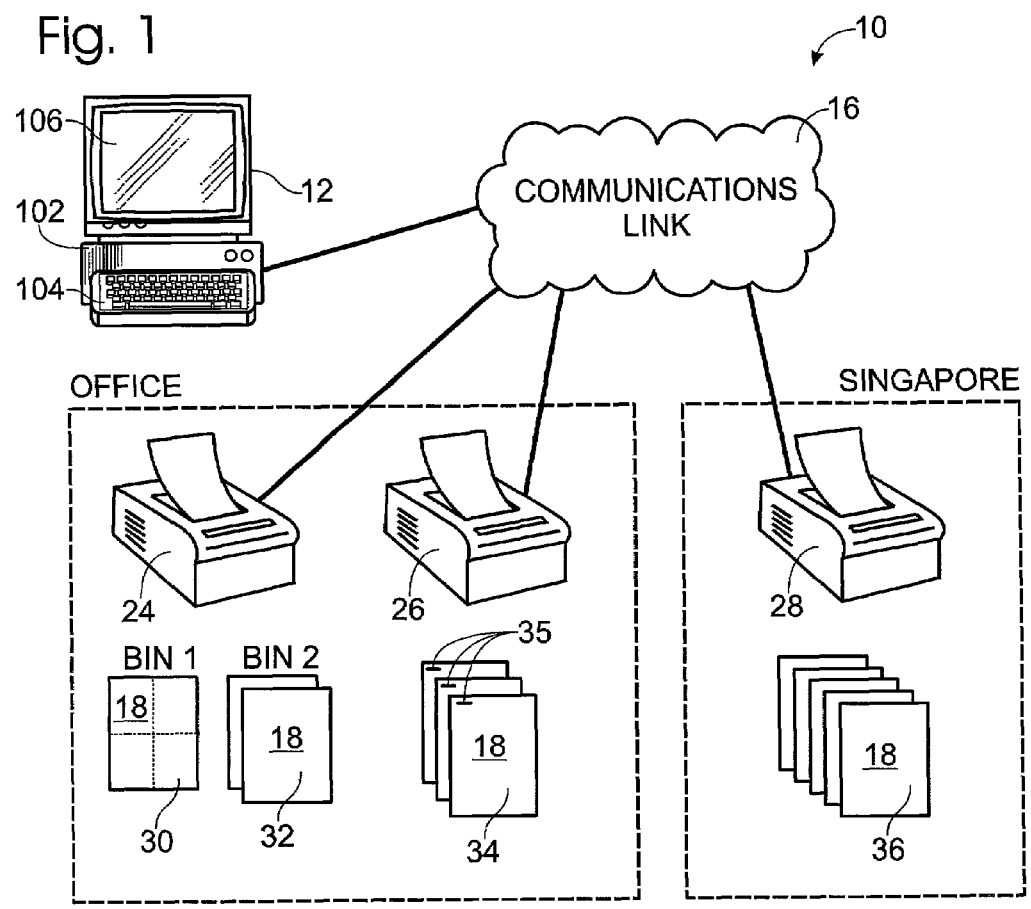
FIG. 1 is a computer-based printing system in which the present invention may be implemented.

Referring initially to FIG. 1, a networked computer system configured to accommodate printing multiple copies of the same document with a single user command is shown generally at 10. Computer system 10 typically includes a computer 12 linked to multiple printers 24, 26, and 28. Printers 24, 26, and 28 are typically linked via a communications link 16. System 10 is configured to send multiple print jobs upon a single user command to a user-selected set of printers, resulting in one or more copies of printed document 18 at each printer in the user-selected set of printers.

Computer 12 is typically a personal computer, however, it should be understood that computer 12 may also be any other type of suitable computing device with a processor. For example, computer 12 may be a portable computer, a hand-held computer, a telephone, a desktop computer or a mainframe computer.

As shown, computer 12 typically includes a processor 102, an input device 104, and an output device 106. Processor 102 may include random access memory (RAM) and/or read only memory (ROM). User input device 104 may include a keyboard (as shown), a mouse, a touch screen, a joystick, etc. Output device 106 may include a display monitor (as shown), a printing device, etc.

Computer 12 is linked via communications link 16 with printers 24, 26, and 28. Communications link 16 may be a telecommunications link, an optical link, or any other suitable type of communications link. Communications link 16 may also be a network. For example, communications link 16 may include a local area network (LAN) and/or a wide area network (WAN). The WAN may be a public network, such as the Internet, or a private communications network. Communications link 16 may be any combination of wired and wireless communication protocols, including Ethernet, infrared, IEEE 802.11, etc.

Printers 24, 26, and 28 may be found at different locations. For example, as shown in FIG. 1, printer 24 and printer 26 are located in a single office complex and are connected via communications link 16 to computer 12. Printers 24 and 26 may be linked to computer 12 through a LAN or other suitable local network. Alternatively, printer 28 is located in a remote location (e.g. Singapore) and may be connected to computer 12 through a WAN or other suitable network.

Generally, the printers in system 10 may be managed by a print server. The print server may be a dedicated server or may be part of computer 12. Computer 12, may also include one or more print drivers, which are used to control each associated printer. These print drivers create a printable file and communicate any accompanying instructions regarding the printing of the file to the respective printer. Alternatively, the print drivers may reside on a print server or on the printers themselves. Each printer may have an individual print driver, or alternatively, there may be a universal driver for a group of networked printers.

Referring back to FIG. 1, printers 24, 26, and 28 may take virtually any form, including both printing and copying devices. For example, printers 24, 26, and 28 may be multi-functional printers, laser printers, inkjet printers, thermal printers, fax machines, or any other suitable printing/copying devices. Print jobs may also be sent to network storage devices or other network destinations. However, for simplicity and not as a limitation, the invention as described illustrates sending print jobs to printers.

Each printer may be directed through computer 12 to perform a print job. A print job, as used herein, refers to the task of printing an electronic document according to user-selected attributes. An electronic document, as used herein, includes any graphics files, complex documents, and other suitable printable files. The attributes or printing instructions that accompany a print job may include printer selection, number of copies selection, formatting and layout instructions, and/or selection of the quality of the draft, print resolution, the media size, and/or the type of media. These attributes are exemplary. It should be understood that other suitable attributes or parameters may be selected, including other finishing and binding options, color options, folding options, border and layout options, options on the which pages of the document are to be printed, etc.

The availability of various attributes may depend on the type of printer linked to computer 12. Different printers provide different functional features. These different features provide a user with different available user-selectable attributes. For example, a printer may or may not accommodate selection of media size, media type, layout, duplex printing, color quality, output bin for the print job, stapling and/or hole punching.

Upon direction from computer 12, an electronic document may be printed on any of the linked set of printers 24, 26, and 28. Computer 12 provides a user interface that permits the user to choose a sub-set of printers, which includes any number of printers from the set of printers linked to computer 12. The user may also select different attributes for each print job via the user interface.

Turning now to FIG. 2, a representative user interface is shown generally at 40. The exemplary user interface is shown as a printer selection display window 42 for display on a computer screen, but other formats are possible. As described above, the user interface permits a user to select attributes for each desired print job. Thus, a user may select a sub-set of printers by choosing any of the set of printers linked to computer 12. For each printer selected, a user may also define additional corresponding attributes depending on the available attributes for the selected printer. Alternatively, if a user fails to select particular attributes for a print job default attributes may be used. These defaults may be set by the user in advance or may be the defaults set at the printer.

The exemplary printer selection display window 42 shows a table for selection of attributes for each print job. A printer selection column is shown at 44 on the left side of printer selection display window 42. In the depicted printer selection display window, each printer is identified by type and location. However, other formats may be used. Additionally, in printer selection display window 42, there are numerous additional attribute columns 46. For example, printer selection display window 42 includes (from the left side to the right side of display window 42) an output bin column, a media-size column, a pages-per-sheet column, a number-of-copies column, a finish column, a media-type column, a duplex-selection column, a print-resolution column, and a color column. As illustrated in FIG. 2, each row 48 represents one print job. Thus, for each print job, the user has selected appropriate attributes, including: a printer, an output bin, media size, pages per sheet, number of copies, finishing qualities, media type, duplex printing, print resolution, and color. For example, as shown in the first row 48 of printer selection display window 42, a user has selected for the print job (from left to right) an LJ-4500 (Office A Mgr) printer, output bin 1, letter-sized media, four pages per sheet, a single copy, normal media, duplex printing, 800 dpi print resolution, and color printing. The user was unable to select a finish attribute because the finish functions were not available on the selected printer. Similarly, other selectable attributes not supported by a selected printer may be "hard set" to a suitable default. Similarly, if a user does not select an attribute (such as shown in the finish column of printer selection display window 42), then a default, set by the user or at the printer, may apply to the print job.

Figure 3:
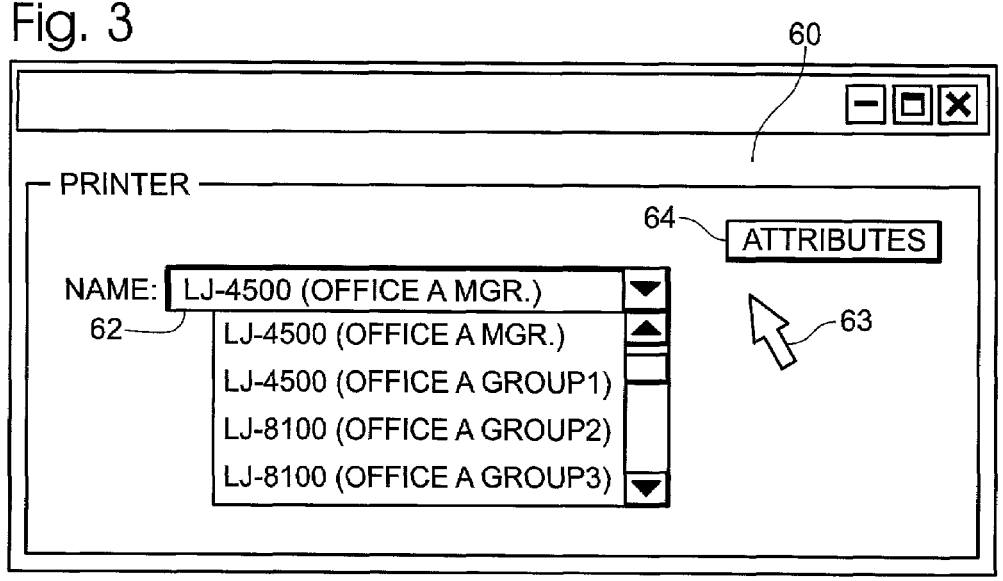
FIG. 3 is an exemplary window display for the system depicted in FIG. 1, showing a pull-down menu for printer selection.
Figure 4:
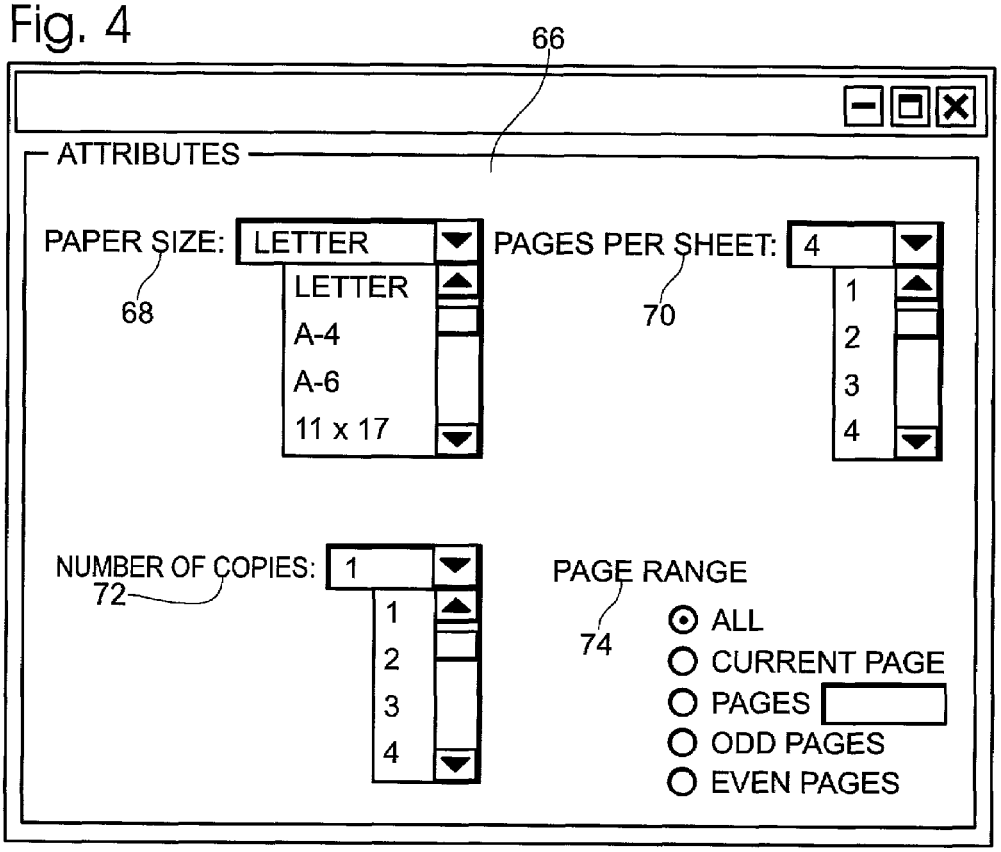
FIG. 4 is an exemplary window display for the system depicted in FIG. 1, showing multiple pull-down selection menus for attribute selection.

As shown in FIGS. 3 and 4, user interface 40 may include pull-down selection menus. These pull-down menus may be incorporated within the printer selection display window 42 or may be a separate window. In FIG. 3, a separate display window 60 is shown where a user may use a pull-down menu 62 to select the appropriate printer for a particular print job. To use the pull-down menu 62, the user places a cursor 63 over the menu, and highlights the desired printer. A user may then proceed to choose additional attributes for the print job by selecting an attributes button 64. The additional attribute choices may vary depending on the selected printer.

Similar to the selection of printers, each additional attribute for the print job may be chosen by using an option selector or pull-down menu. These pull-down menus may be available on a printer selection display window 42 or in another suitable window. For example, in FIG. 4, a separate display window 66 is shown with multiple pull-down selection menus for additional attributes for the print job, including a media-size menu 68, a pages-per-sheet menu 70, a number-of-copies menu 72 and page-ranges menu 74. These windows, 60 and 66 (shown in FIGS. 3 and 4), are shown for illustrative purposes only and are not intended to limit the invention as disclosed. Thus, a user may select a printer and additional corresponding attributes using pull-down menus or other methods including check boxes or by typing in the desired attribute.

After selecting a desired sub-set of printers and associated attributes for each print job, the user then submits a single print request effecting completion of a master print job. For example, in FIG. 2, printer selection display window 42 may include a user-selectable submit icon, such as submit button 50 that submits the master print job to the appropriate printers in a single command. The master print job, as used herein, includes sending each separate print job to each respective printer in the user-selected sub-set. Hence, with a single user command, a user is able to produce multiple printouts of an electronic document at multiple print destinations. The user does not have to separately order each print job. Depending on the selected printers, the electronic document to be printed may be rasterized on a common server and then distributed to the appropriate printers.

By way of illustration, FIG. 1 demonstrates the results of submitting the master print job according to the user-selected printers and attributes in printer selection display window 42 in FIG. 3. With a single print command, the user submits a master print job including four separate print jobs to three different printers, 24, 26, and 28. Each separate print job includes different user-selected attributes. Thus, the output from submission of the master print job, includes submitting a first print job (output shown at 30) which includes printing one copy of an electronic document to output bin 1 of printer 24. The output includes one copy of printed document 18 on letter-sized media with four pages per sheet. Likewise, the output from submission of the master print job results in a second print job (output shown at 32) being sent to output bin 2 of printer 24. The result of the second print job is two copies of printed document 18. A third print job (output shown at 34) is submitted to printer 26, which results in three copies of printed document 18 on A4 paper each with a staple finish (indicated at 35). Printer 28, located in Singapore, receives a fourth print job (output shown at 36) resulting in five copies of printed document 18.

In another embodiment of the disclosed invention, a user may access previously-selected printers and attributes thereby avoiding re-entering the same set of print jobs multiple times. As used herein, these stored lists of print attributes, or master print jobs are referred to as print distribution lists. The print distribution lists may be stored in memory on computer 12 (shown in FIG. 1), a network server, or any other storage device. For example, a local or personal computing device may be used to store personal print distribution lists, while a communications link server may be used to store company wide print distribution lists. Each print distribution list may be accessed using processor 102 (shown in FIG. 1).

As shown in FIG. 2 and discussed above, print jobs 48 collectively form a master print job. The master print job may be stored as a print distribution list. Thus, a user may store the master print job (shown in FIG. 2 at 52) as the "Marketing" print distribution list. A user may later retrieve the stored print distribution list by using a pull-down menu illustrated at 54. Other formats may be used to retrieve stored print distribution lists.

Once accessing a stored distribution list, a user may submit an electronic document to the pre-prepared print distribution list using a single submit command as described above. Alternatively, a user may retrieve the print distribution list and alter the attributes to accommodate the requirements of a particular print job. Thus, a user may add or eliminate a printer on the print distribution list or modify other attributes of individual print jobs. For example, the user may want to send ten copies of the present document to the Singapore printer. Hence, a user may change the five copies designated for the print job from the stored list to ten copies. The user, after modifying the print distribution list, may then submit the master print job with a single print request. The user may save the revised master print job as a customized print distribution list.

The distribution list may include additional destinations for a file or document other than a set of printers. For example, the distribution list may also send soft copies of the electronic document to designated folders or electronic mail accounts on the user's computer or on a recipient's computer. Hence, a user, in a single operation, may send an electronic document to multiple printers and to designated folders and e-mails accounts.

It should be understood that the invention encompasses not only a system, but also various methods for printing to multiple destinations. FIG. 5 provides an illustration of such a method, indicated generally at 200. The method is implemented on a computer-based system that includes a computing device linked to a set of printers. The method includes, at 202, receiving user input defining a plural number of print jobs. The user may input the plural number of print jobs through a user print interface that is configured to enable a user to select attributes for each print job. Thus, the user may select a printer from the set of linked printers for each print job. Moreover, as described in the disclosure above, the user may choose additional attributes for each print job including selecting the number of copies, media type, binding type, color and draft quality, etc.

The method further includes, at 204, receiving a single print command from the user to print the plural number of print jobs. Input of a single print directive sends each print job to the appropriate destination. At 206, each print job is printed on the user-selected printer according to the user-selected attributes.

As shown at 208, each set of print attributes may be stored as a print distribution list. The print distribution list may be saved on any memory storage device. A user may at a later date retrieve the stored print distribution list and send a subsequent electronic document to appropriate destinations according to the pre-selected print attributes. Additionally, a user may alter the print attributes on the list to customize the print distribution list.

FIG. 6 is another illustration of a method according to another embodiment of the present invention. The method shown in FIG. 6 is generally indicated at 300. Similar to the method described above, the method illustrated in FIG. 5 is implemented on a computer-based system where a computer is linked via a communications link to a plurality of devices. The linked devices include at least one printer as described in the above disclosure. However, the devices may also include a fax machine or computer.

The method includes, at 302, receiving user input selecting a pre-stored print distribution list. The pre-stored print distribution list may include a predefined sub-set of communications linked devices. Moreover, the print distribution list has at least one pre-selected set of print attributes for a print job. The distribution list may be stored on the user's personal computing device, on a network server, or on any other suitable device.

Once a distribution list is selected, the method further includes, at 304, receiving user input ordering an electronic document to be sent to the devices on the distribution list without the user individually sending each order. The electronic document (at 306) is then sent to each device on the distribution list.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A computer-implemented printing system comprising:
a set of printers configured to print user-selected print jobs;
a communications link; and
a processor linked via the communications link to the set of printers, the processor having a user interface configured to accommodate user-selection of a sub-set of printers of the set of printers, the processor being configured to communicate plural print jobs to the sub-set of printers upon a single command, wherein the user interface is configured to allow a user to select different attributes for each print job of the plural print jobs communicated to the sub-set of printers.

2. The system of claim 1, wherein the communications link is the Internet.

3. The System of claim 1, wherein at least one of the printers in the sub-set of printers is in a remote location from the processor.

4. The System of claim 1, wherein the sub-set of printers is a single printer.

5. A computer-implemented printing system for printing to multiple print jobs via a single print command, comprising:
plural printers, each printer configured to print user-selected print jobs;
a communications link; and
a computer linked to the printers via the communications link, the computer having a user interface configured to accommodate user selection of a plurality of print jobs corresponding to a plurality of respective printers, wherein the computer is further configured to receive individually-selectable attributes of each print job and to communicate the plurality of print jobs to the respective printers without the user separately ordering each individual print job.

6. The system of claim 5, wherein the individually-selectable attributes of the plurality of print jobs are stored as a print distribution list for subsequent use.

7. The system of claim 5, wherein the user interface includes a user-selectable submit icon which sends the plurality of print jobs to the plurality of respective printers in a single command.

8. The system of claim 5, wherein the user interface includes a pull-down menu for user-selection of individually-selectable attributes of each print job.

9. A computer-implemented method of printing to multiple print jobs from a single computer in a single action, the method comprising:
receiving user input defining plural print jobs, each print job having different user-selected print job attributes;
receiving a single print directive to print the print jobs on respective network devices, wherein at least one of the network devices is a printer, and
upon receiving the single print directive, directing identified network devices to print respective print jobs according to the corresponding user-selected attributes.

10. The method of claim 9, further comprising storing the user-selected print job attributes of the plural print jobs as a print distribution list for subsequent use.

11. The method of claim 10, where user input is selection of a print distribution list.

12. The method of claim 10, further comprising reaccessing the stored print distribution list and printing an electronic document according to the user-selected print job attributes of the plural print jobs on the stored print distribution list.

13. The method of claim 10, further comprising reaccessing the print distribution list, modifying user-selected print job attributes corresponding to at least one print job on the print distribution list and printing an electronic document according to the user-selected print job attributes on the modified print distribution list.

14. The method of claim 10, wherein the network devices also includes a computer.

15. A medium readable by a computer, having embodied therein instructions executable by the computer to perform the steps of:
receiving user input defining plural print jobs, each print job having individually-selected print job attributes;
receiving a single print directive to print the print jobs on respective network devices, wherein at least one of the network devices is a printer; and
upon receiving the single print directive, directing identified network devices to print respective print jobs according to the corresponding individually-selected print job attributes.

16. The medium of claim 15, where the instructions executable by the computer further includes instructions for storing the user-selected print job attributes of the plural print jobs as a print distribution list for subsequent use.

17. The medium of claim 15, where the instructions executable by the computer further includes instructions for reaccessing the print distribution list, modifying user-selected print job attributes corresponding to at least one print job on the print distribution list and printing an electronic document according to the user-selected print job attributes on the modified print distribution list.

* * * * *

UNITED STATES PATENT AND TRADEMARK OFFICE
CERTIFICATE OF CORRECTION

PATENT NO. : 7,054,021 B2
APPLICATION NO. : 09/905582
DATED : May 30, 2006
INVENTOR(S) : Robert Sesek et al.

It is certified that error appears in the above-identified patent and that said Letters Patent is hereby corrected as shown below:

In column 7, line 37, in Claim 3, delete "System" and insert -- system --, therefor.

In column 7, line 40, in Claim 4, delete "System" and insert -- system --, therefor.

In column 8, line 12, in Claim 9, delete "printer," and insert -- printer; --, therefor.

Signed and Sealed this

Tenth Day of March, 2009

JOHN DOLL
*Acting Director of the United States Patent and Trademark Office*